United States Patent
Nishiyama et al.

(10) Patent No.: US 10,899,677 B2
(45) Date of Patent: Jan. 26, 2021

(54) **METHOD FOR CULTIVATING CROPS USING BACTERIUM BELONGING TO GENUS *BACILLUS***

(71) Applicant: Asahi Biocycle Co., Ltd., Tokyo (JP)

(72) Inventors: Toki Nishiyama, Kanagawa (JP); Taisuke Uesugi, Kanagawa (JP); Gentaro Yasuda, Kanagawa (JP); Hiroaki Murakami, Kanagawa (JP); Yoshiaki Yamamoto, Shizuoka (JP)

(73) Assignee: Asahi Biocycle Co., Ltd., Tokyo (JP)

( * ) Notice: Subject to any disclaimer, the term of this patent is extended or adjusted under 35 U.S.C. 154(b) by 1084 days.

(21) Appl. No.: 14/910,792

(22) PCT Filed: Aug. 6, 2014

(86) PCT No.: PCT/JP2014/070704
§ 371 (c)(1),
(2) Date: Feb. 8, 2016

(87) PCT Pub. No.: WO2015/020080
PCT Pub. Date: Feb. 12, 2015

(65) Prior Publication Data
US 2016/0185676 A1 Jun. 30, 2016

(30) Foreign Application Priority Data

Aug. 9, 2013 (JP) .................. 2013-166933
Dec. 11, 2013 (JP) .................. 2013-256473

(51) Int. Cl.
*C05F 11/00* (2006.01)
*C05F 11/08* (2006.01)
(Continued)

(52) U.S. Cl.
CPC .............. *C05F 11/08* (2013.01); *A01G 22/00* (2018.02); *A01N 63/00* (2013.01)

(58) Field of Classification Search
CPC ...... A01G 22/00; A01N 63/00; A01N 43/653; C05F 11/08
See application file for complete search history.

(56) References Cited

U.S. PATENT DOCUMENTS 4,551,164 A 11/1985 Tenzer
4,919,936 A 4/1990 Iwanami et al.
(Continued)

FOREIGN PATENT DOCUMENTS

CN 85108913 A 5/1987
CN 1110708 A 10/1995
(Continued)

OTHER PUBLICATIONS

Office Action dated Apr. 18, 2018, in TW 103127127.
(Continued)

*Primary Examiner* — Monica L Barlow
*Assistant Examiner* — Aaron M Rodziwicz
(74) *Attorney, Agent, or Firm* — Foley & Lardner LLP

(57) ABSTRACT

The present application provides: a microbial material for agricultural use characterized by containing, as an active ingredient, *Bacillus subtilis* C-3102 strain (FERM BP-1096) that is capable of promoting the growth of crops and/or increasing the yield of crops, or a variant thereof that has an ability equivalent thereto; and a method for cultivating crops characterized by comprising cultivating the crops using a soil or medium that contains the microbial material.

5 Claims, 2 Drawing Sheets

* P<0.01

(51) Int. Cl.
*A01G 22/00* (2018.01)
*A01N 63/00* (2020.01)

(56) References Cited

U.S. PATENT DOCUMENTS

| | | | |
|---|---|---|---|
| 5,733,355 | A | 3/1998 | Hibino et al. |
| 2003/0228679 | A1 | 12/2003 | Smith et al. |
| 2006/0008512 | A1* | 1/2006 | Hooge ............... A61K 31/198 424/442 |
| 2006/0130545 | A1 | 6/2006 | Niyazaki et al. |
| 2008/0318777 | A1 | 12/2008 | Lin et al. |
| 2012/0094834 | A1* | 4/2012 | Frank .................. A01N 43/653 504/117 |
| 2014/0308733 | A1* | 10/2014 | Nishiyama ............... C12N 1/20 435/242 |
| 2015/0079059 | A1* | 3/2015 | Uesugi .................. A01N 63/02 424/93.46 |

FOREIGN PATENT DOCUMENTS

| | | |
|---|---|---|
| CN | 1073142 C | 10/2001 |
| CN | 101801891 A | 8/2010 |
| CN | 102458130 A | 5/2012 |
| CN | 102816725 A | 12/2012 |
| CN | 102910988 A | 2/2013 |
| DE | 4237146 A1 | 5/1994 |
| EP | 0287699 A | 10/1988 |
| EP | 1142988 A1 | 10/2001 |
| EP | 1598122 A1 | 11/2005 |
| JP | 63-209580 A | 8/1988 |
| JP | 10-276579 A | 10/1998 |
| JP | 2004-215567 A | 8/2004 |
| JP | 2006-016386 A | 1/2006 |
| JP | 2009-232721 A | 10/2009 |
| JP | 2010-530350 A | 9/2010 |
| JP | 2011-051902 A | 3/2011 |
| JP | 2012-526073 A | 10/2012 |
| JP | 2013-042695 A | 3/2013 |
| JP | 2013-060378 A | 4/2013 |
| JP | 2013-066467 A | 4/2013 |
| TW | 201136528 A | 11/2011 |
| TW | 201315807 A | 4/2013 |
| WO | WO 00/42169 A1 | 7/2000 |
| WO | WO 2004/067197 A1 | 8/2004 |
| WO | WO 2010/128003 A2 | 11/2010 |
| WO | WO 2013/035804 A1 | 3/2013 |
| WO | WO 2013/042900 A2 | 3/2013 |

OTHER PUBLICATIONS

International Search Report dated Sep. 16, 2014, in PCT/JP2014/070704.

Office Action dated Jun. 20, 2018, in CN 201480042927.X.

Yu et al., "Study on factors influencing the siderophore production of Bacillus subtilis Bs-15 and effects of Bs-15 on disease control and growth promotion of sweetpepper," Chinese Journal of Pesticide Science, 2010, 12(2):135-141, with English abstract.

Agriculture and Forestry, 2012, 4:46-49, with English summary of related part.

Lei et al., "Bacillus subtilis Effect on Tea Yield," Tea Communication, Dec. 2012, 39(4):26-28, with English abstract.

Zhang et al., "Control Effects of Complex Bio-agent on Peanut Replant Disease," Journal of Henan Agricultural Sciences, 2012, 41(9):47-49, with English abstract.

Supplementary European Search Report dated Mar. 10, 2017, in EP 14834688.5.

* cited by examiner

* P＜0.01

METHOD FOR CULTIVATING CROPS USING BACTERIUM BELONGING TO GENUS *BACILLUS*

CROSS-REFERENCE TO RELATED APPLICATIONS

This application is a National Stage application of PCT/JP2014/070704, filed Aug. 6, 2014, which claims priority from Japanese application nos. JP 2013-166933, filed Aug. 9, 2013, and JP 2013-256473, filed Dec. 11, 2013.

TECHNICAL FIELD

The present invention relates to a method for cultivating crops using a bacterium of the genus *Bacillus*, in particular *Bacillus subtilis*.

BACKGROUND ART

Chemical fertilizers and pesticides have been widely used for the purposes of improving productivity of crops and protecting crops from plant diseases or insect pests. In recent years, however, there has been increasing interest in organic farming. Against the backdrop of such demand, the use of microorganisms in the field of agriculture has been gathering attention. In particular, among endophytes, which are microorganisms that coexist with plants, endophytes useful for the control of plant diseases and insect pests, endophytes useful for the growth of plants and the increase of yield, and the like are known (Patent Documents 1-3). In addition to such endophytes, microorganisms such as *Bacillus* bacteria that have an ability of controlling soil diseases to antagonize soil-borne plant pathogens in soil, *Bacillus* bacteria that have plant growth promoting activities, and the like are also known (Patent Documents 4-9).

When increasing yields, if it is intended to increase the yield per plant individual, there is a concern that quality in terms of nutrients or the like might deteriorate. In this regard, it is necessary to increase the yield while maintaining quality rather than increasing the yield alone.

Many of the above microorganisms are specific strains. Selection of microorganisms that are highly useful for agriculture is significantly labor- and time-consuming, and it also requires determining whether microorganisms can be used in practice for agriculture.

PRIOR DOCUMENTS

Patent Documents

Patent Document 1: JP Patent Publication (Kokai) No. 2013-042695 A
Patent Document 2: JP Patent Publication (Kokai) No. 2011-051902 A
Patent Document 3: JP Patent Publication (Kokai) No. 2009-232721 A
Patent Document 4: JP Patent Publication (Kokai) No. 2013-66467 A
Patent Document 5: JP Patent Publication (Kohyo) No. 2012-526073 A
Patent Document 6: JP Patent Publication (Kokai) No. 2006-16386 A
Patent Document 7: JP Patent Publication (Kokai) No. 2004-215567 A
Patent Document 8: WO 00/42169
Patent Document 9: JP Patent Publication (Kokai) No. H10-276579 A (1998)

SUMMARY OF THE INVENTION

Problem to be Resolved by the Invention

An object of the present invention is to provide a method for cultivating crops using *Bacillus subtilis*, whereby the growth of crops is promoted and the yield of crops increases.

Means for Resolving the Problems

The present invention encompasses the following features.
(1) A microbial material for use in agriculture, characterized by comprising, as an active ingredient, *Bacillus subtilis* C-3102 strain (FERM BP-1096) that has an ability to promote the growth of a crop and/or to increase the yield of the crop, or a variant thereof having an ability equivalent to the *Bacillus subtilis* C-3102 strain.
(2) The microbial material of (1), wherein the *Bacillus subtilis* C-3102 or a variant thereof is immobilized on a support.
(3) The microbial material of (1) or (2), wherein the *Bacillus subtilis* C-3102 or a variant thereof further has an ability to shorten the internode length of a crop.
(4) The microbial material of any one of (1) to (3), wherein the *Bacillus subtilis* C-3102 or a variant thereof further has an ability to promote flowering of a crop or to raise a flowering rate of a crop.
(5) The microbial material of any one of (1) to (4), wherein the *Bacillus subtilis* C-3102 or a variant thereof further has an ability to promote ripening of fruits of a crop.
(6) The microbial material of any one of (1) to (5), wherein the *Bacillus subtilis* C-3102 or a variant thereof further has an ability to maintain quality of fruits of a crop.
(7) A method for cultivating a crop, characterized by comprising cultivating the crop using a soil or medium that contains the microbial material of any one of (1) to (6).
(8) The method of (7), wherein the cultivation is an indoor cultivation or greenhouse cultivation.
(9) The method of (7) or (8), wherein the cultivation is performed using pots.
(10) The method of any one of (7) to (9), wherein the cultivation results in promoting the growth of a crop, increasing a crop yield, shortening an internode length of a crop, promoting the flowering of a crop, raising a flowering rate of a crop, promoting ripening of fruits of a crop, or maintaining quality of fruits of a crop.
(11) The method of any one of (7) to (10), wherein the crop is selected from solanaceous plants and cucurbitaceous plants.
(12) The method of any one of (7) to (11), wherein the crop is tomato (*Solanum lycopersicum*).
(13) Use of *Bacillus subtilis* C-3102 strain (FERM BP-1096) or a variant thereof in a microbial material for agriculture.

When the microbial material of the present invention is used in crop cultivation, the following advantages are attained without deteriorating the quality of crops: i.e., increasing yields of crops by shortening internode and by raising flowering rates; promoting the ripening of fruits; improving workability; and the like. In particular, significant advantages have been obtained for plants like tomatoes, which are *Solanum lycopersicum*. The internode shortening is considered effective for cucurbitaceous plants which are crops having internodes. Further, raising flowering rates and promoting the ripening of fruits are expected to bring about similar advantages for crops characterized by fruit formation and ripening after flowering, such as fruit vegetables, fruits, and the like.

This description includes all or part of the contents as disclosed in the descriptions and/or drawings of Japanese Patent Application No. 2013-166933 and No. 2013-256473, from which the present application claims priority.

MODE FOR CARRYING OUT THE INVENTION

1. *Bacillus subtilis* C-3102

Figure 1:
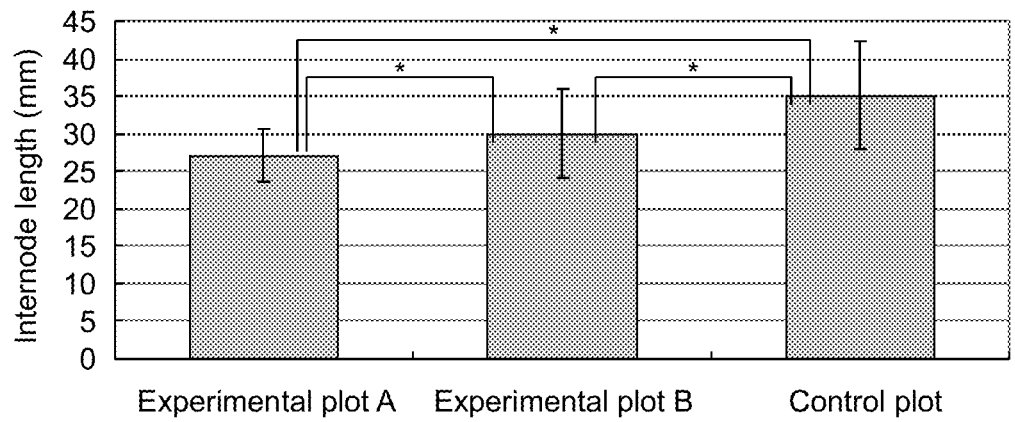
FIG. 1 shows the results of the measurement of internode lengths between cotyledon and first joint, as described in Example 1, at the stage at which tomato seedlings were planted and then transferred to a drip irrigation system. The results show an average internode length of 262 seedlings per plot. *Bacillus subtilis* C-3102 strain (FERM BP-1096) was added to soil at the following concentrations: 1% (w/v) for experimental plot A, 0.1% (w/v) for experimental plot B, and no addition of *Bacillus subtilis* C-3102 strain (FERM BP-1096) for control plot.

The bacterium used in the present invention is the *Bacillus subtilis* C-3102 strain that has an ability to promote the growth of crops and to increase the yield of crops, or a variant thereof having an ability equivalent to the *Bacillus subtilis* C-3102 strain (hereinafter also referred to as "the C-3102 strain or the like").

The C-3102 strain or the like is characterized in that it further has an ability to shorten the internode length of crops, an ability to promote flowering of crops or to raise flowering rates of crops, an ability to promote the ripening of fruits of crops, and/or an ability to maintain quality of fruits of crops, in addition to the aforementioned ability.

The term "internode length" used herein refers to a length between the cotyledon and the first joint of plant stem in a plant. The shorter the internode length, the greater the number of joints at which fruits such as tomato occur, resulting in an increased yield. In addition, because the plant height decreases, workability is improved.

The *Bacillus subtilis* C-3102 strain was deposited by the present applicant with the International Patent Organism Depositary, the National Institute of Advanced Industrial Science and Technology (previously called the Fermentation Research Institute, Agency of Industrial Science and Technology of the Ministry of International Trade and Industry) (Tsukuba Central 6, 1-1-1 Higashi, Tsukuba, Ibaraki 305-8566, Japan) as of Dec. 25, 1985 under accession no. FERM BP-1096. According to the receipt to the depositor, the microorganism is displayed with the name "*Bacillus subtilis* c-3102." "*Bacillus subtilis* C-3102 (FERM BP-1096)," "*Bacillus subtilis* C-3102 strain," "the C-3102 strain," and the like used herein have meanings identical to the expression "*Bacillus subtilis* c-3102." At present, this deposited strain has been stored under the management by the NITE Patent Microorganisms Depositary (NPMD) (#122, 2-5-8 Kazusakamatari, Kisarazu-shi, Chiba 292-0818, Japan).

Variants of the C-3102 strain can be obtained by artificial mutagenesis treatment, specifically by performing mutations of the C-3102 strain using any suitable mutagen. The mutagen is intended to include agents having mutagenic actions, high-energy radiation, or the like. Examples of the mutagen include ethyl methanesulfonate, N-methyl-N'-nitro-N-nitrosoguanidine, UV irradiation, heavy ion beam irradiation, X-ray irradiation, and gamma-ray irradiation.

The *Bacillus subtilis* C-3102 strain can be prepared by culturing the strain under appropriate conditions using a culture medium that is usually used for the culture of microorganisms. The medium used for culture may be any natural medium or synthetic medium in the form of liquid medium or solid medium, as long as it contains carbon sources, nitrogen sources, inorganic salts, and the like and it can culture *Bacillus subtilis* with good efficiency. A person skilled in the art can select a known medium appropriate for the strain to be used. Examples of carbon sources that can be used include lactose, glucose, sucrose, fructose, galactose, and molasses. Examples of nitrogen sources that can be used include peptone, casein hydrolysates, whey protein hydrolysates, and nitrogen-containing organic substances such as soy protein hydrolysates. In addition, examples of inorganic salts that can be used include phosphates, sodium salts, potassium salts, magnesium salts, calcium salts, and salts of trace elements. Moreover, if necessary, amino acids, vitamins, surfactants, and the like can be added to the medium. Examples of solid media suitable for cultivation of *Bacillus subtilis* include TS (Trypticase soy) agar medium, HI (heart infusion) agar medium, and the like.

The culture of *Bacillus subtilis* is performed at 20° C. to 50° C. and preferably 30° C. to 45° C. under aerobic conditions. Temperature conditions can be adjusted using a constant-temperature bath, a mantle heater, a jacket, or the like. The mode of culture is stationary culture, shaking culture, tank culture, or the like. In addition, the culture time is 12 hours to 7 days, and preferably it may be 2 to 3 days. The pH of the medium at the start of culture is 5 to 9, and it is preferably maintained at 6 to 8.

According to the present invention, a culture solution of the C-3102 strain or the like may be directly used or the bacterial culture solution may be used in the form of a bacterial concentrate obtained by separation by a means of centrifugation, filtration separation, membrane separation, or the like. Alternatively, the C-3102 strain or the like subjected to drying (e.g., lyophilization) may be used, or the C-3102 strain or the like may be immobilized on a support.

2. Microbial Material

The present invention provides a microbial material for use in agriculture, characterized by comprising, as an active ingredient, *Bacillus subtilis* C-3102 strain (FERM BP-1096) that has an ability to promote the growth of crops and to increase the yield of crops, or a variant thereof having an ability equivalent to the the *Bacillus subtilis* C-3102 strain.

The microbial material includes, but is not limited to, a bacterial culture solution, a bacterial concentrate, a dry bacterial product, an immobilized bacterial product, and the like, of the C-3102 strain or the like. In addition, the concentration of the C-3102 strain or the like may be any concentration, when the final concentration in soil is, but is not limited to, $1 \times 10^3$ to $1 \times 10^8$ cfu/g, preferably $1 \times 10^5$ to $1 \times 10^8$ cfu/g, and more preferably $1 \times 10^7$ to $1 \times 10^8$ cfu/g.

As exemplified above, the bacterial culture solution can be obtained by culture using media and culture conditions that are conventionally used for *Bacillus subtilis*.

The bacterial concentrate can be obtained, for example, by dehydration treatment of a culture solution under reduced pressure at a temperature that does not kill the bacteria, or by filtration of a culture solution using a cross-flow filter for concentration of the culture solution.

The dry bacterial product can be obtained, for example, by freeze-drying a culture solution.

The immobilized bacterial product can be obtained by allowing one or more supports, preferably porous supports made of calcium carbonate, rice bran, activated carbon, diatomaceous earth, talc, zeolite, vermiculite, peat moss, perlite, bentonite, montmorillonite, or the like, to adsorb a bacterial culture solution, followed by drying. The drying may be freeze-drying, vacuum drying, or the like. The obtained dry product may be pulverized to an extent that the bacterial cells are not destroyed.

The microbial material may be obtained by combining the C-3102 strain or the like, an active ingredient, and agriculturally acceptable optional ingredients to obtain various formulations of microbial material. Examples of such formulations include, but are not limited to, powders, wettable powders, granules, solutions, and suspensions.

Examples of optional ingredients include diluents, excipients, binders, dispersing agents, and fillers.

In addition, the microbial material can be used such that the microorganism concentration in soil is, but is not limited to, about $1 \times 10^3$ to $1 \times 10^8$ cfu/g, preferably $1 \times 10^5$ to $1 \times 10^8$ cfu/g, and further preferably $1 \times 10^7$ to $1 \times 10^8$ cfu/g. The microorganism concentration may be higher than $1 \times 10^8$ cfu/g as described in the Examples below. For example, even if it is $1 \times 10^8$ to $1.5 \times 10^8$ cfu/g or $1 \times 10^8$ to $2 \times 10^8$ cfu/g, similar advantages can be obtained.

3. Method for Cultivating a Crop

The present invention further provides a method for cultivating a crop, characterized by comprising cultivating the crop using a soil or medium containing the microbial material described above.

The cultivation may be either outdoor cultivation or indoor cultivation, including, for example, soil cultivation, greenhouse cultivation, hydroponic cultivation, and soilless cultivation. The microbial material of the present invention allows the internode length and height of crops to shorten or decrease, thereby improving workability. Therefore, the present invention is suitable for greenhouse cultivation. Furthermore, conventional techniques can be used for each cultivation method.

Examples of indoor cultivation include greenhouse cultivation and cultivation at a plant factory. Indoor cultivation literally means cultivation in indoor facilities, which may be equipped with watering systems, systems for controlling temperature/humidity/light, etc., nutrient replenishment systems, and the like.

For cultivation using pots, it is possible to continuously perform the cultivation from seeding to production in each pot. Alternatively, instead of seeding, seedlings may be transplanted into pots for cultivation.

The microbial material of the present invention is added to a support base made of soil, cellulose fibers or the like, followed by uniformly mixing them. Then, a mineral nutrient solution and/or an organic nutrient solution are/is appropriately added thereto. Water and nutrient solutions are regularly supplied depending on the growth of crops.

In general, fertilizers are contained in or applied to a soil, a medium, or the like, which is used for soil cultivation, soilless cultivation, hydroponic cultivation, or the like. Fertilizers used for soil cultivation and fertilizers used for soilless cultivation or hydroponic cultivation slightly differ from each other in terms of their compositions. For example, three elements (nitrogen, phosphorus, and potassium), calcium, magnesium, and the like are used as fertilizers for soil cultivation, while growing media used for soilless cultivation or hydroponic cultivation contain, as essential elements absorbed by plants via their roots, nitrogen, phosphorus, potassium, calcium, magnesium, sulfur, boron, iron, manganese, zinc, molybdenum, and the like. Preferable medium components vary depending on crop types, as well as on varieties, cultivation seasons, growth stages, temperatures, light conditions, and the like. In practice, because it is difficult to strictly control such conditions, in general, a growing medium (or a medium) with a same composition is used, and the concentration thereof is adjusted depending on the growth stages or cultivation seasons.

According to the cultivation method of the present invention, the cultivation results in promoting the growth of crops, increasing the yield of crops, shortening the internode length of crops, promoting the flowering of crops, raising the flowering rate of crops, ripening fruits of crops, and/or maintaining the quality of fruits of crops. The expression "maintaining the quality" used herein means that the weight, sugar content, or acid content of a crop are not disadvantageously influenced by increase of crop yields.

Examples of crops include, but are not limited to, solanaceous plants, cucurbitaceous plants, cruciferous plants, asteraceae plants, leguminous plants, liliaceous plants, and umbelliferous plants.

Examples of solanaceous plants include tomato, eggplant, green pepper, sweet green pepper, red pepper, potato, wolfberry, paprika, jalapeno, and habanero.

Examples of cucurbitaceous plants include cucumber, pumpkin, watermelon, and balsam pear.

Examples of cruciferous plants include rape, turnip, bok Choy, nozawana (*Brassica rapa* var. *hakabura*), karashina (mustard green), takana (Japanese mustard green), kobutakana (*Brassica juncea* Coss. var. *stromata*.), mizuna (*Brassica rapa nipposinica*), kohlrabi, arugula, watercress, tatsoi, cauliflower, cabbage, kale, Chinese cabbage, komatsuna (Japanese mustard spinach), daikon (Japanese radish), radish (*Raphanus sativus* var. *sativus*), broccoli, and Brussels sprouts.

Examples of asteraceae plants include lettuce, red leaf lettuce, crown daisy, and chrysanthemum.

Examples of leguminous plants include soybean, adzuki bean, peanut, kidney bean, pea, scarlet runner bean, broad bean, cowpea, chickpea, mung bean, lentil, lima bean, and Bambara groundnut.

Examples of liliaceous plants include onion, green onion, Chinese onion, garlic, Chinese leek, Japanese chive, lily, asparagus, and eschalot.

Examples of umbelliferous plants include carrot, Japanese honewort, parsley, celery, Japanese parsley, herb celery, chervil, and fennel.

Basically, a crop for which improvement of workability and/or increase of yields in indoor cultivation can be expected through shortening of internode length is any fruit vegetable, preferably including solanaceous plants such as tomato and cucurbitaceous plants such as pumpkin and melon.

Further, a crop for which increase of yields can be expected through increasing the flowering rate and/or promoting the ripening of fruits is any fruit vegetable or fruit, preferably including fruit vegetables such as tomato, watermelon, melon, and strawberry; and fruits such as apple, orange, grape, and peach.

EXAMPLES

The present invention will be specifically described with reference to the Examples below. However, it is contemplated that the technical scope of the invention is not limited to the Examples.

Example 1

<Mixing of the Strain into Soil>

*Bacillus subtilis* C-3102 strain (FERM BP-1096) ($1 \times 10^{10}$ cfu/g) was added to a nursery compost for tomato cultivation to result in a concentration of 1% (w/v) or 0.1% (w/v), followed by sufficiently mixing them. Three plots were prepared with the addition of the *Bacillus subtilis* C-3102 strain (FERM BP-1096) to soil at the following concentrations and then subjected to testing: 1% (w/v) for experimental plot A, 0.1% (w/v) for experimental plot B, and no addition of *Bacillus subtilis* C-3102 strain (FERM BP-1096) for control plot. Table 1 shows the results of the colony count for *Bacillus subtilis* C-3102 strain (FERM BP-1096) after mixing.

TABLE 1

| Plot | Mixing rate (w/v) of B. subtilis C-3102 (FERM BP-1096) | Colony count (cfu/g) of B. subtilis C-3102 (FERM BP-1096) |
| --- | --- | --- |
| Experimental plot A | 1.0% | $1.1 \times 10^8$ |
| Experimental plot B | 0.1% | $1.6 \times 10^7$ |
| Control plot | — | N.D. |

N.D. < $1.0 \times 10^2$ cfu/g

<Tomato Cultivation>

Tomato seeds were seeded in plug pots at 262 seeds per plot and subsequently cultivated for about two weeks. Then, the obtained tomato seedlings were transferred to pots (90 mm) for cultivation using the soil prepared above. At the time of about one month after seeding, the tomato seedlings were transferred to a drip irrigation system.

<Internode Measurement>

At the stage at which the seedlings were planted and transferred to the drip irrigation system in the above manner, internode lengths between the cotyledon and the first joint were measured. Table 2 and FIG. 1 show the results. The average internode length for 262 seedlings was 27.1 mm for experimental plot A, 30.0 mm for experimental plot B, and 35.0 mm for the control plot. It was confirmed that the internode was significantly shortened depending on the concentration of the added *Bacillus subtilis* C-3102 strain (FERM BP-1096) ($P<0.01$).

TABLE 2

| | Internode length (mm) |
| --- | --- |
| Experimental plot A | 27.1 |
| Experimental plot B | 30.0 |
| Control plot | 35.0 |

Example 2

<Mixing of the Strain into Soil>

*Bacillus subtilis* C-3102 strain (FERM BP-1096) ($1 \times 10^{10}$ cfu/g) was added to a nursery compost for tomato cultivation at a concentration of 0.1% (w/v), followed by sufficiently mixing them. Two plots were prepared with the addition of *Bacillus subtilis* C-3102 strain (FERM BP-1096) to soil at the following concentrations and then subjected to testing: 0.1% (w/v) for an experimental plot and no addition of *Bacillus subtilis* C-3102 strain (FERM BP-1096) for control plot. Table 3 shows the results of the colony count for *Bacillus subtilis* C-3102 strain (FERM BP-1096) after mixing.

TABLE 3

| Plot | Mixing rate (w/v) of B. subtilis C-3102 (FERM BP-1096) | Colony count (cfu/g) of B. subtilis C-3102 (FERM BP-1096) |
| --- | --- | --- |
| Experimental plot | 0.1% | $1.0 \times 10^7$ |
| Control plot | — | N.D. |

N.D. < $1.0 \times 10^2$ cfu/g

<Tomato Cultivation>

The tomato seedlings were transferred to a drip irrigation system in the manner described in Example 1. Cultivation was performed while supplying water and liquid fertilizers. When tomato fruits ripened, harvesting was started. Cultivation was terminated after 72 days of harvesting. The entire process of cultivation was carried out in greenhouses, and the conditions other than the conditions for the addition of *Bacillus subtilis* C-3102 strain (FERM BP-1096) to soil were the same for each plot. Cultivation was performed using 240 seedlings for the experimental plot and 246 seedlings for the control plot.

<Determination of the Number of Trusses at the Time of Harvesting>

At the time of harvesting (when fruits at the first truss ripened), the height of tomato plants and the number of trusses with tomato flowers were determined for the experimental plot and the control plot. A comparison of the height showed that the plants grew to a level of 2 m or higher, at which harvesting was difficult, in the control plot, while, the plants appropriately grew to a level of nearly 2 m in the experimental plot. The number of trusses with flowers at the level of 2 m or lower was average 5.03 for the experimental plot and average 4.87 for the control plot. That is, a larger number of trusses were observed in the experimental plot at or below a level of 2 m, at which harvesting is possible, compared with the number of trusses in the control plot. As a result, it was confirmed that internode shortening effects can be maintained with the addition of *Bacillus subtilis* C-3102 strain (FERM BP-1096) even at the time of harvesting.

TABLE 4

| | Number of trusses with flowers |
| --- | --- |
| Experimental plot | 5.03 |
| Control plot | 4.87 |

<Degree of Coloring of Fruits at the Early Stage of Harvesting>

Cultivation was performed in the above manner. At the beginning of the time of harvesting (about 5 months after seeding), the number of red-colored fruits in a state acceptable for harvesting was determined for the experimental plot and in the control plot. Table 5 shows the results. In the experimental plot, the number of red-colored fruits was twice or more that in the control plot, and thus harvesting was possible. As a result, it was confirmed that the addition of *Bacillus subtilis* C-3102 strain (FERM BP-1096) promotes or accelerates ripening of fruits.

TABLE 5

|  | Number of red-colored fruits |
|---|---|
| Experimental plot | 59 |
| Control plot | 23 |

<Yield Determination>

Figure 2:
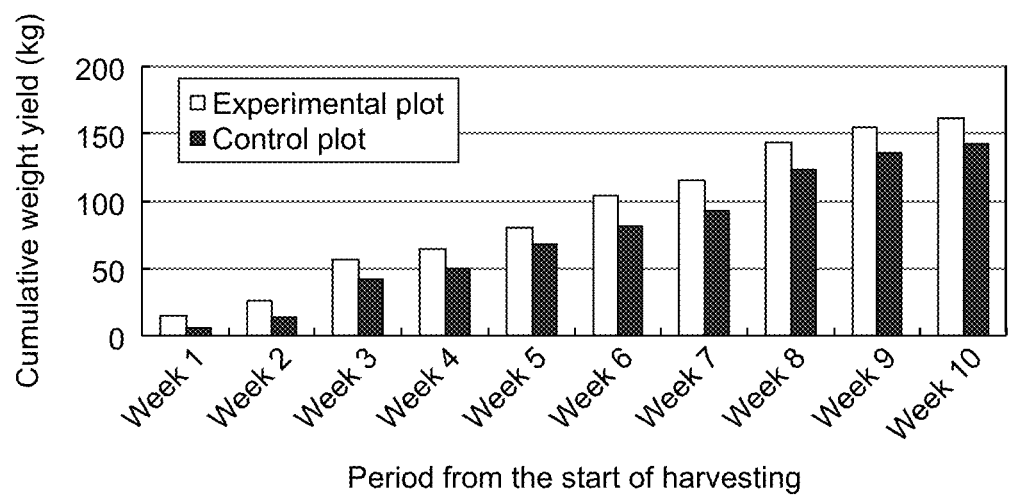
FIG. 2 is a graph showing the comparison between the experimental plot and the control plot in terms of cumulative yields (kg) of tomatoes harvested in weeks 1 to 10, as described in Example 2.

Table 6 shows the results of determining the weight yield and the number of tomatoes harvested during cultivation for the experimental plot and the control plot. In addition, FIG. 2 shows cumulative results of weight yield every one week after the start of harvesting. The weight yields were 162.1 kg for the experimental plot and 142.1 kg for the control plot, and the number of harvested fruits was 1643 for the experimental plot, while the number was 1462 for the control plot, over the course of harvesting. As a result, it was confirmed that the addition of *Bacillus subtilis* C-3102 strain (FERM BP-1096) caused the weight yield per seedling to increase by 16.9% and the number of harvested fruits to increase by 15.3%. In addition, when the weight per tomato fruit was compared, it was found that the weights were 98.7 g for the experimental plot and 97.2 g for the control plot, suggesting that the yield could be increased without reduction of the fruit size.

TABLE 6

|  | Weight yield (kg) | Number of harvested fruits | Weight per fruit (g) |
|---|---|---|---|
| Experimental plot | 162.1 | 1643 | 98.7 |
| Control plot | 142.1 | 1462 | 97.2 |

Further, in order to confirm the quality of harvested tomatoes, the sugar content and the acid content were determined using 15 tomatoes harvested from the experimental plot and 15 tomatoes harvested from the control plot at the early stage of harvesting (at the start of harvesting), the middle stage of harvesting (one month after the start of harvesting), and the late stage of harvesting (two months after the start of harvesting). Tomatoes were stemmed, put into a zipper plastic bag, crushed using a bag mixer for 30 seconds. Thereafter, the crushed tomatoes were filtered through cotton cloth. The juice squeezed therefrom was used for determination of the sugar content and the acid content. The sugar content was determined using a refractometer for Brix measurement, and the acid content was determined using an acidity meter and converted into citric acid concentration. Table 7 shows the results. No obvious differences in sugar content or acid content were found between the experimental plot and the control plot. This suggested that the addition of *Bacillus subtilis* C-3102 strain (FERM BP-1096) allows the yield to increase without reduction of quality (sugar content and acid content).

TABLE 7

|  | Time of harvesting | Sugar content (%) | Acid content (%) |
|---|---|---|---|
| Experimental plot | Early stage | 5.91 | 0.43 |
|  | Middle stage | 6.86 | 0.42 |
|  | Late stage | 8.03 | 0.48 |

TABLE 7-continued

|  | Time of harvesting | Sugar content (%) | Acid content (%) |
|---|---|---|---|
| Control plot | Early stage | 5.89 | 0.44 |
|  | Middle stage | 6.63 | 0.39 |
|  | Late stage | 7.17 | 0.37 |

Example 3

<Mixing of the Strain into Soil>

*Bacillus subtilis* C-3102 strain (FERM BP-1096) ($1 \times 10^{10}$ cfu/g) was added to a nursery compost for tomato cultivation to result in a concentration of 0.1% (w/v), followed by sufficiently mixing them. Two plots were prepared with the addition of *Bacillus subtilis* C-3102 strain (FERM BP-1096) to soil at the following concentrations and then subjected to testing: 0.1% (w/v) for an experimental plot and no addition of *Bacillus subtilis* C-3102 strain (FERM BP-1096) for a control plot. Table 8 shows the results of the colony count for *Bacillus subtilis* C-3102 strain (FERM BP-1096) after mixing.

TABLE 8

| Plot | *B. subtilis* C-3102 (FERM BP-1096) mixing rate (w/v) | *B. subtilis* C-3102 (FERM BP-1096) colony count(cfu/g) |
|---|---|---|
| Experimental plot | 0.1% | $1.0 \times 10^7$ |
| Control plot | — | N.D. |

N.D. < $1.0 \times 10^2$ cfu/g

<Cultivation of Tomato>

Tomato seeds were seeded and cultivated for about two weeks. Then, the obtained tomato seedlings were cultivated in pots (90 mm) using the soil prepared above, and 246 seedlings and 240 seedlings were prepared for an experimental plot and a control plot, respectively.

<Determination of the Number of Flowering Seedlings>

At the stage at which the seedlings were raised, planted, and transferred to the drip irrigation system in the manner described above, the rate of flowering of seedlings was determined for the experimental plot and the control plot. As a result, as shown in Table 9, the flowering rate was 49.2% for the control plot, while it was 95.8% for the experimental plot, indicating that flowering of almost all seedlings took place in the experimental plot. Accordingly, it was confirmed that the addition of *Bacillus subtilis* C-3102 strain (FERM BP-1096) promotes flowering of seedlings.

TABLE 9

|  | Number of flowering seedlings | Flowering rate (%) |
|---|---|---|
| Experimental plot | 230 | 95.8 |
| Control plot | 118 | 49.2 |

INDUSTRIAL APPLICABILITY

The present invention enables promoting the growth of crops and increasing the yield of crops with the use of *Bacillus subtilis* for cultivation of crops such as solanaceous plants. Therefore, the present invention is useful for agriculture.

DEPOSITION OF MICROORGANISMS

The *Bacillus subtilis* C-3102 strain was deposited by the applicant of the present application with the International Patent Organism Depositary, the National Institute of Advanced Industrial Science and Technology (previously called the Fermentation Research Institute, Agency of Industrial Science and Technology of the Ministry of International Trade and Industry) (AIST Tsukuba Central 6, 1-1-1 Higashi, Tsukuba, Ibaraki 305-8566, Japan) as of Dec. 25, 1985 with accession no. FERM BP-1096. At present, this deposited strain has been stored under the management by the NITE Patent Microorganisms Depositary (NPMD) (#122, 2-5-8 Kazusakamatari, Kisarazu-shi, Chiba 292-0818, Japan).

All publications, patents, and patent applications cited herein are incorporated herein by reference in their entirety.

The invention claimed is:

1. A method for cultivating a crop, characterized by comprising cultivating a crop selected from the group consisting of solanaceous plants and cucurbitaceous plants using a soil or medium that contains a microbial material comprising, as an active ingredient, *Bacillus subtillis* C-3102 strain (FERM BP-1096), thereby promoting growth of a crop, increasing a crop yield, shortening an internode length of a crop, promoting flowering of a crop, raising a flowering rate of a crop, promoting ripening of fruits of a crop, and/or maintaining quality of fruits of a crop.

2. The method of claim 1, wherein the cultivating is an indoor cultivation or greenhouse cultivation.

3. The method of claim 1, wherein the cultivating is performed using pots.

4. The method of claim 1, wherein the crop is tomato (*Solanum lycopersicum*).

5. The method of claim 1, wherein the *Bacillus subtillis* C-3102 strain is immobilized on a support.

* * * * *